United States Patent
Kim et al.

(10) Patent No.: US 6,665,172 B1
(45) Date of Patent: Dec. 16, 2003

(54) SOLID ELECTROLYTIC CAPACITOR (75) Inventors: Jae Kwang Kim, Suwon (KR); Kwan Hyeong Kim, Suwon (KR)

(73) Assignee: Samsung Electro-Mechanics Co., Ltd., Kyungki-do (KR)

( * ) Notice: Subject to any disclaimer, the term of this patent is extended or adjusted under 35 U.S.C. 154(b) by 0 days.

(21) Appl. No.: 10/216,828

(22) Filed: Aug. 13, 2002

(30) Foreign Application Priority Data

May 22, 2002 (KR) ........................................ 2002-28358

(51) Int. Cl.[7] ................................................. H01G 9/00
(52) U.S. Cl. ........................ 361/523; 361/528; 361/532
(58) Field of Search ............................... 361/523, 528, 361/532, 533, 535, 510, 516, 517

(56) References Cited

U.S. PATENT DOCUMENTS 5,424,909 A * 6/1995 Kuriyama ................... 361/534
5,850,332 A * 12/1998 Kunieda et al. ............ 361/523

FOREIGN PATENT DOCUMENTS

| JP | 5-335189 | | 12/1993 |
| JP | 8-195330 | * | 7/1996 |
| JP | 8-255729 | * | 10/1996 |

OTHER PUBLICATIONS

Japan Abstract Publication No. 5–335189 Dec. 17, 1993.
Japan Abstract Publication No. 8–195330 Jul. 30, 1996.

* cited by examiner

Primary Examiner—Anthony Dinkins
(74) Attorney, Agent, or Firm—Lowe Hauptman Gilman & Berner LLP (57) ABSTRACT

A solid electrolytic capacitor includes a capacitor element, an anode wire extending from a first side of the capacitor element by a predetermined length, and an anode lead frame forming an anode terminal. The anode lead frame has a groove at a first end thereof for receiving an end portion of the terminal end of the anode wire thereon, and has a second end thereof mounted on a PCB. A cathode lead frame forms a cathode terminal and has a first end attached to an external surface of the capacitor element and a second end mounted on the PCB. An epoxy case covers the capacitor element, the anode lead frame, and the cathode lead frame. The anode wire is welded to the anode lead frame.

20 Claims, 13 Drawing Sheets

PRIOR ART

FIG. 3

PRIOR ART

PRIOR ART

SOLID ELECTROLYTIC CAPACITOR

BACKGROUND OF THE INVENTION

1. Field of the Invention

The present invention relates, in general, to a solid electrolytic capacitor and, in particular, to an improved solid electrolytic capacitor including a capacitor element with a capacitance that is increased by enlarging the space occupied by the capacitor element within a limited space of the epoxy case, and an anode lead frame which can minimize the heat transfer to the capacitor element during an assembly of a capacitor element and a lead frame, simplifying the production of the solid electrolytic capacitor.

2. Description of the Prior Art

A solid electrolytic capacitor is an electronic device for storing an electric charge, preventing the passage of a direct current, and passing an alternating current. Among various solid electrolytic capacitors, a tantalum capacitor is most widely applied to general industrial machinery, and to an application circuit used in a low rated voltage range. In particular, the tantalum capacitor is used to reduce a noise of a circuit or a portable communication apparatus in which a frequency characteristic is important.

The tantalum capacitor 100, as shown in FIGS. 1 to 4, comprises a capacitor element 110 consisting of dielectric powder which determines the capacitance and characteristic of a capacitor, an anode lead frame 130 and a cathode lead frame 140 connected to the capacitor element 110 so as to easily mount the capacitor on a printed circuit board (hereinafter referred to simply as a 'PCB'), and an epoxy case 150 for protecting the capacitor element 110.

A process of manufacturing the tantalum capacitor 100, comprises the steps of pressing tantalum powder into rectangular parallelepiped-shaped pellet, sintering and degassing the rectangular parallelepiped-shaped pellet, anodizing the pellet to form tantalum oxide ($Ta_2O_5$) layer on the exposed tantalum surfaces, infiltrating a manganese nitrate solution into the pellet, and thermally decomposing the infiltrated pellet to form a manganese dioxide layer, that is, a solid electrolyte on a surface of the resulting pellet.

A process of connecting the anode lead frame 130 and the cathode lead frame 140 to the capacitor element 110 thus manufactured comprises the steps of welding a rod-shaped anode wire 120 protruding by a predetermined length from a lateral side of the capacitor element 110 to a plate-shaped anode lead frame 130 by an electrical spot welding process to form an anode terminal, and soldering the cathode lead frame 140 to an external surface of the capacitor element 110 using a conductive adhesive such as carbon or silver powder coated on the external surface of the capacitor element 110 to form a cathode terminal (See Japanese Laid-Open Patent Publication No. 5-335189 of Honda Hisafumi et al.). Thereafter, the capacitor element 110, electrically connected to the anode lead frame 130 and cathode lead frame 140 is molded with epoxy powder in an encapsulating step so as to form an epoxy case 150 for protecting the capacitor element 110, and subjected to a marking step which ends the manufacturing process of the capacitor 100.

However, the conventional process of welding the anode wire 120 to the anode lead frame 130 while they are in contact with an upper and a lower electrodes 161 and 162, indispensably comprises a bending step of forming a flat pressed surface 122 on an external side of the anode wire 120 before welding of the anode wire to the anode lead frame in order to prevent shaking occurring in welding, and to increase a contact efficiency between them. The conventional process is thus disadvantageous in that an external mechanical impact readily occurring in the bending step is transferred through the anode wire 120 to the capacitor element 110 destroying the dielectric layer. As a result, the electrical property of the capacitor, for example, an LC value is degraded. In addition, the production cost of the capacitor is increased owing to the bending step.

In addition, in case that the anode wire 120 is welded to the anode lead frame 130 with a metal such as lead or tin, said metal can be melted due to the high temperature generated when mounting the capacitor. Thus, a broken electrical connection can occur.

Furthermore, a conventional process of soldering an external lower side of the capacitor element 110 to an upper side of the cathode lead frame 140 with a conductive adhesive is disadvantageous in that the space occupied by the capacitor element 110 within a limited space of an epoxy case 150 is relatively small, and a volume of the capacitor element 110 is small, thereby limiting capacitance of the capacitor 100 and the increasing impedance.

Figure 1:
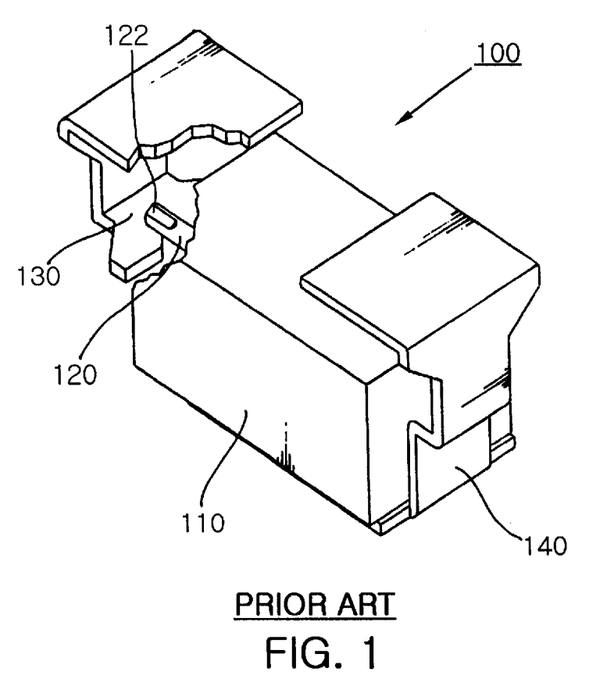
FIG. 1 is a perspective view of a conventional solid electrolytic capacitor.
Figure 2:
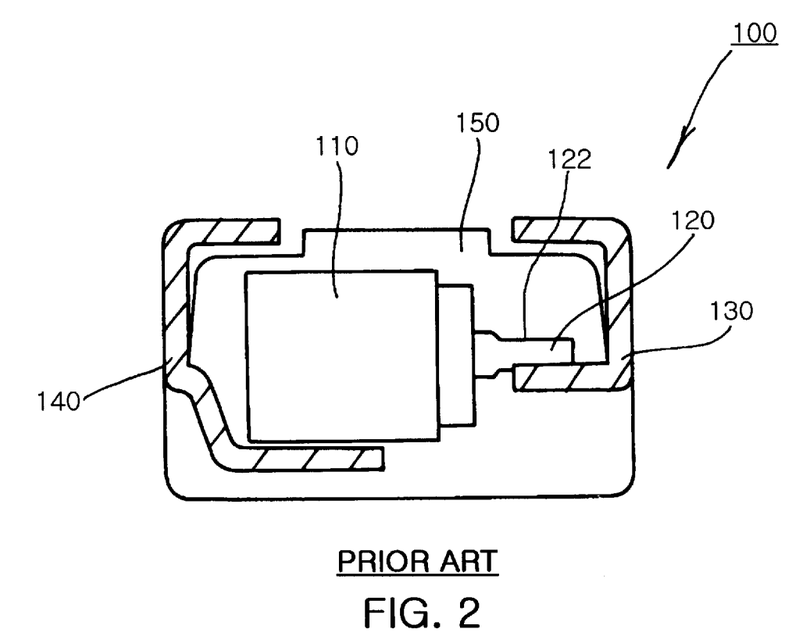
FIG. 2 is a sectional view of the conventional solid electrolytic capacitor.
Figure 3:
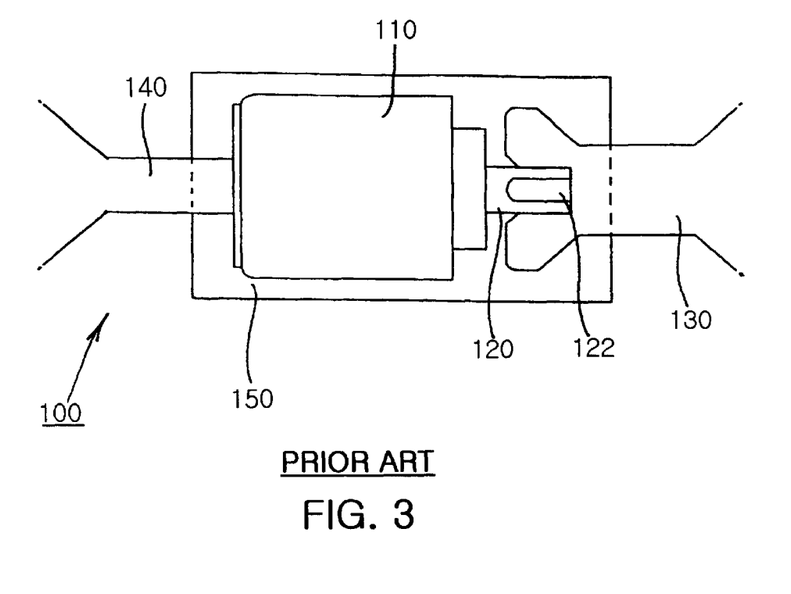
FIG. 3 is a plan view of the conventional solid electrolytic capacitor.
Figure 4:
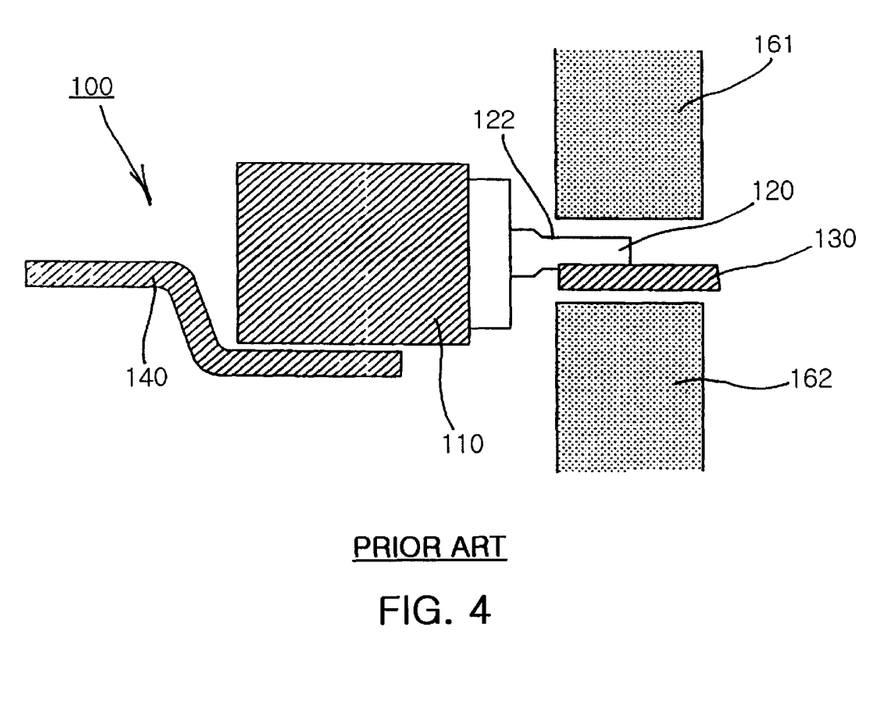
FIG. 4 is a view illustrating a conventional solid electrolytic capacitor.
Figure 5:
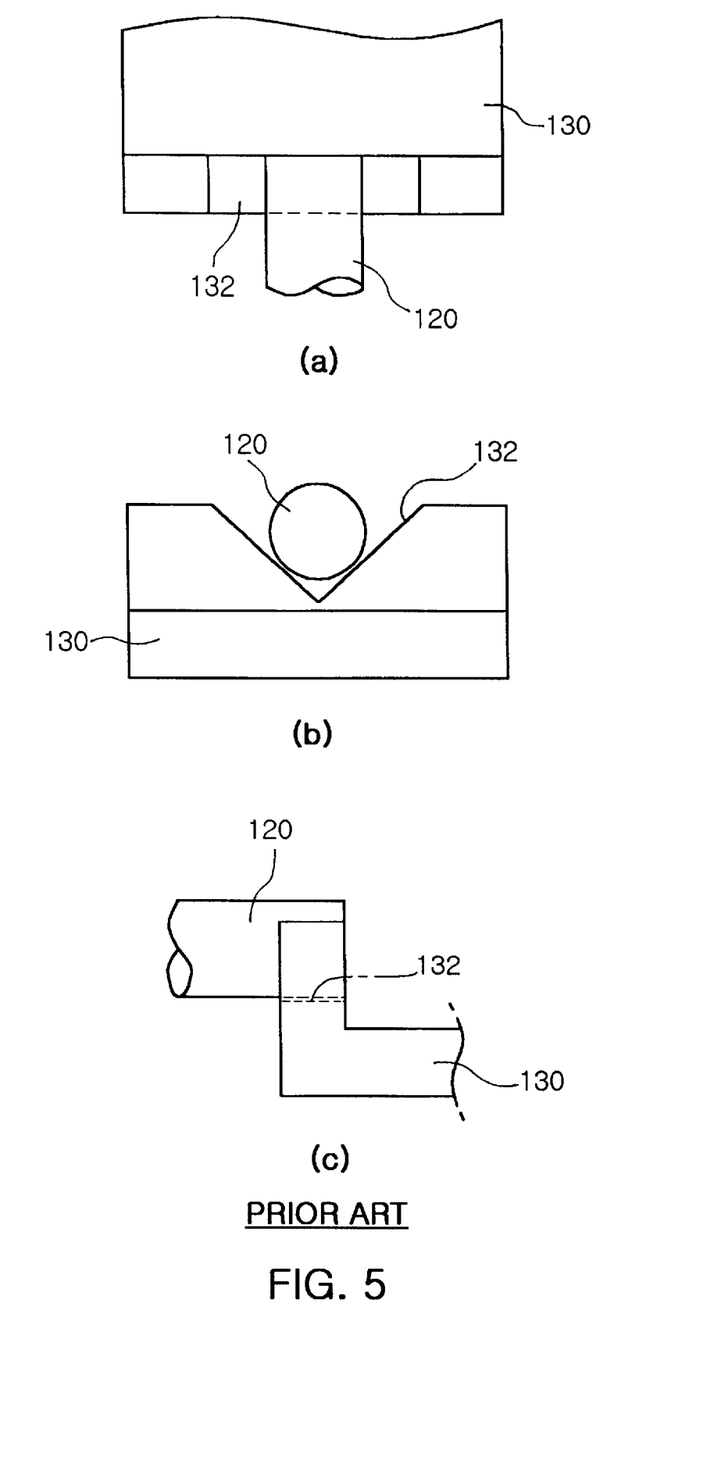
FIGS. 5a to 5c are a plan view, an elevational view, and a side view of the conventional solid electrolytic capacitor engaged with a lead frame having a notch part, respectively.

Meanwhile, the anode wire 120 of the capacitor element 110 may be welded to the anode lead frame 130 by a laser welding process instead of the electrical spot welding process as disclosed in Japanese Laid-Open Patent Publication No. 8-195330 by Mitsui Koichi et al. More specifically, a V-shaped notch part 132 is formed on the anode lead frame 130, the anode wire 120 of the capacitor element 110 is mounted on the notch part 132, and portions of the frame 130 located at both sides of the anode wire 120 are melted by a laser beam to weld the anode wire 120 to the anode lead frame 130, as shown in FIGS. 5a to 5c.

However, when the anode wire 120 is welded to the anode lead frame 130 by the laser beam, the welding process is very complicated because the laser beam is simultaneously irradiating two portions of the frame 130 located on both sides of the anode wire 120.

In addition, because the portions irradiated by the laser beam are restricted to a cut section of the notch part 132 corresponding to the thickness of the anode lead frame 130, an area for welding the anode wire 120 to the anode lead frame 130 is small, and so the laser output of the laser welding machine must be increased in order to increase welding efficiency. At this time, a spark occurring during the laser welding may reach the capacitor element 110, damaging the capacitor element 110.

Moreover, the external surface of the anode lead frame 130 has a high absorbability of the laser beam because the external surface usually has a dark gray color, and so the welding characteristic thereof is excellent, but the notch part formed in a shape of 'V', having a color of an inner metal of the anode lead frame 130 has a poor absorbability of the laser beam and a high reflectivity against the laser beam, and so the welding characteristic thereof becomes poor. Accordingly, the laser output of the laser welding machine must be increased in order to improve the welding efficiency, and thus consumption of electricity is increased, and heat impact and sparks transferred to the capacitor element 110 are increased, thereby increasing the damage to the element.

SUMMARY OF THE INVENTION

Therefore, it is an object of the present invention to avoid the above disadvantages, and to provide a solid electrolytic capacitor, which can avoid a bending process, minimize the heat transfer to its capacitor element in order to obtain a stable electrical characteristic, increase its operational reliability, and reduce its production cost owing to a simplified production process of the solid electrolytic capacitor.

It is another object of the present invention to provide a solid electrolytic capacitor, which can sufficiently enlarge the capacitance of its capacitor element by increasing the space occupied by the capacitor element within a limited space of an epoxy case.

It is still another object of the present invention to provide a solid electrolytic capacitor, which can improve welding efficiency between a lead frame and an anode wire by preventing a shaking of the anode wire.

Based on the present invention, the above objects can be accomplished by a provision of a solid electrolytic capacitor, comprising a capacitor element; an anode wire extending from a first side of the capacitor element by a predetermined length; an anode lead frame having a groove at a first end thereof for mounting an end portion of the anode wire thereon and a second end thereof for mounting on a PCB; a cathode lead frame having a first end attached to an external surface of the capacitor element and a second end for mounting on the PCB; and a mold case, preferably an epoxy case, covering the capacitor element, the anode lead frame, and the cathode lead frame. In the capacitor, the anode wire is welded to the anode lead frame by melting a portion of the anode lead frame in contact with the end portion of the anode wire positioned on the groove, using a heat source.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PRESENT INVENTION

Figure 6:
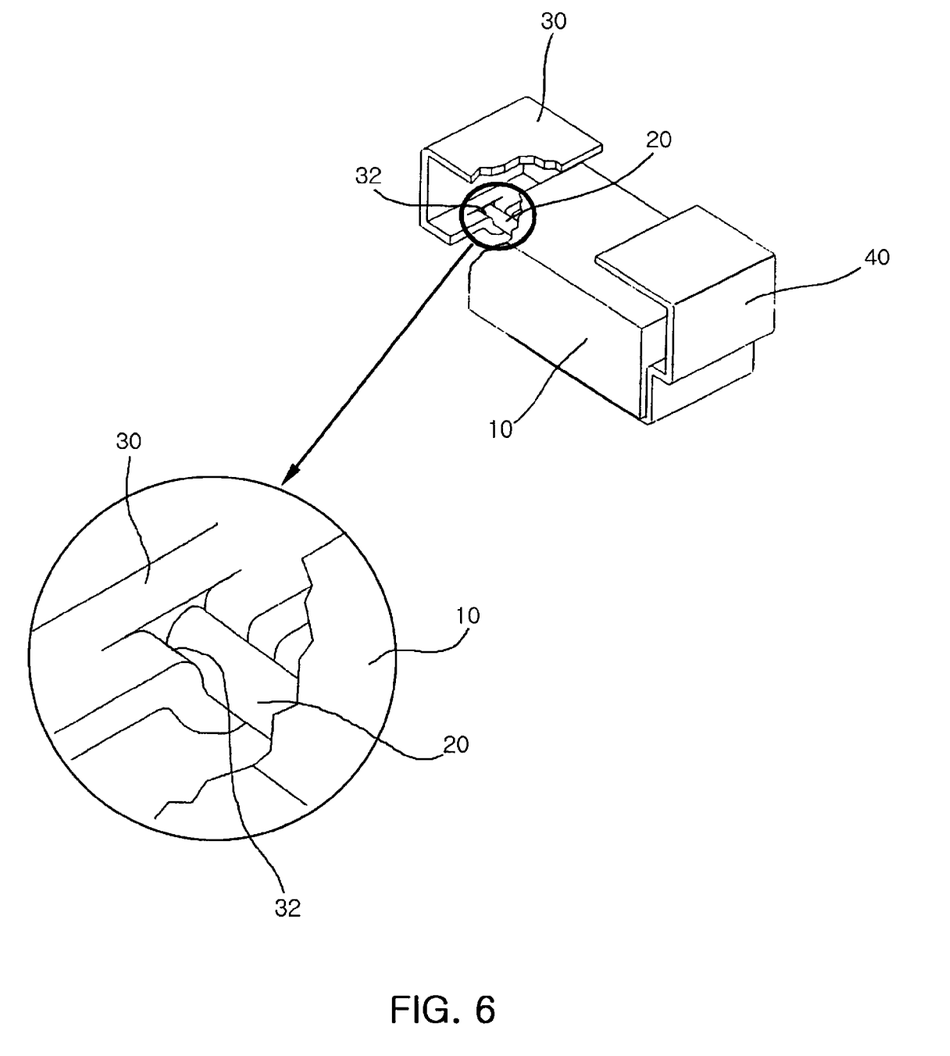
FIG. 6 is a perspective view of a solid electrolytic capacitor according to a first embodiment of the present invention.
Figure 7:
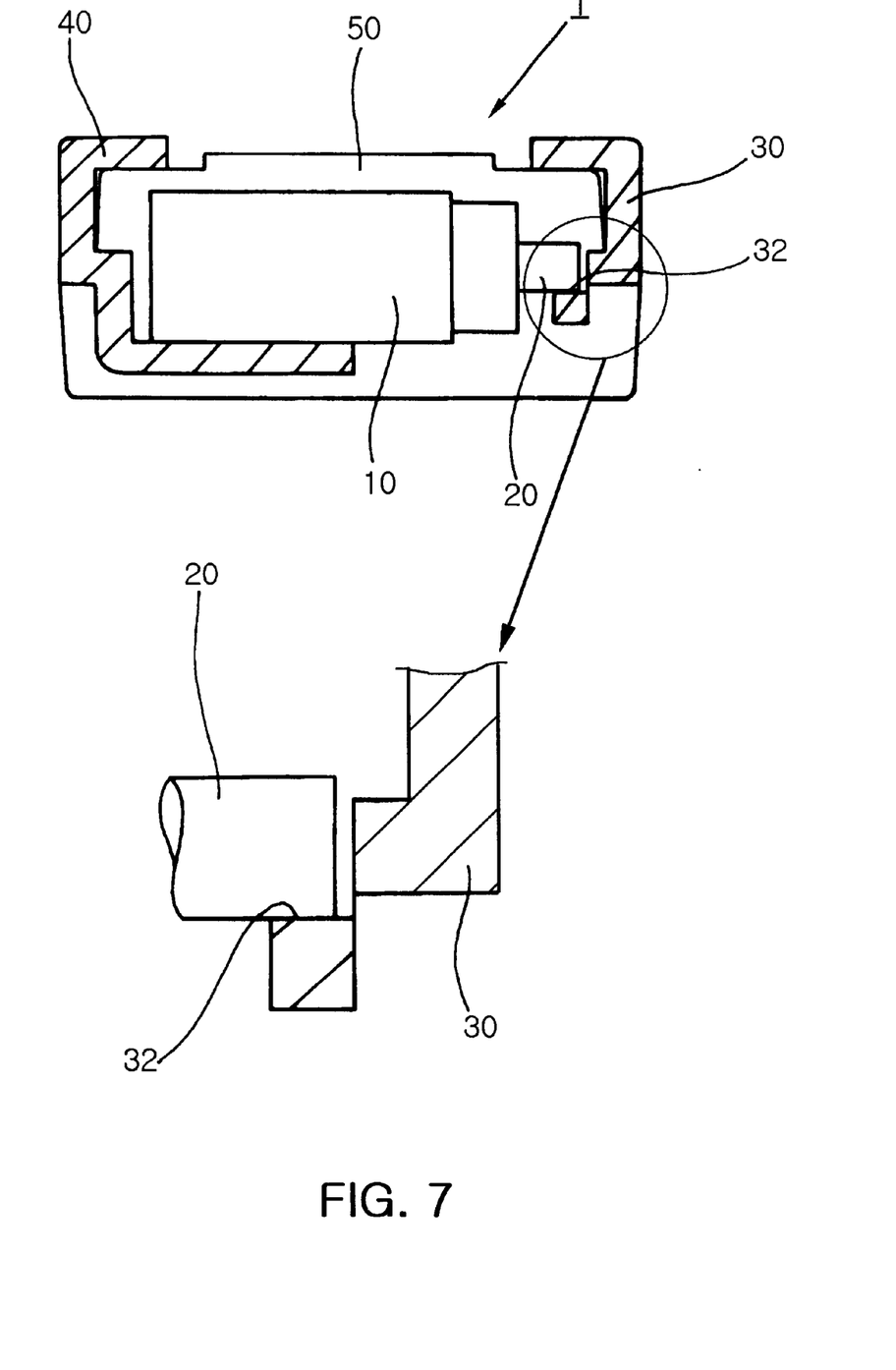
FIG. 7 is a sectional view of the solid electrolytic capacitor according to the first embodiment of the present invention.
Figure 8:
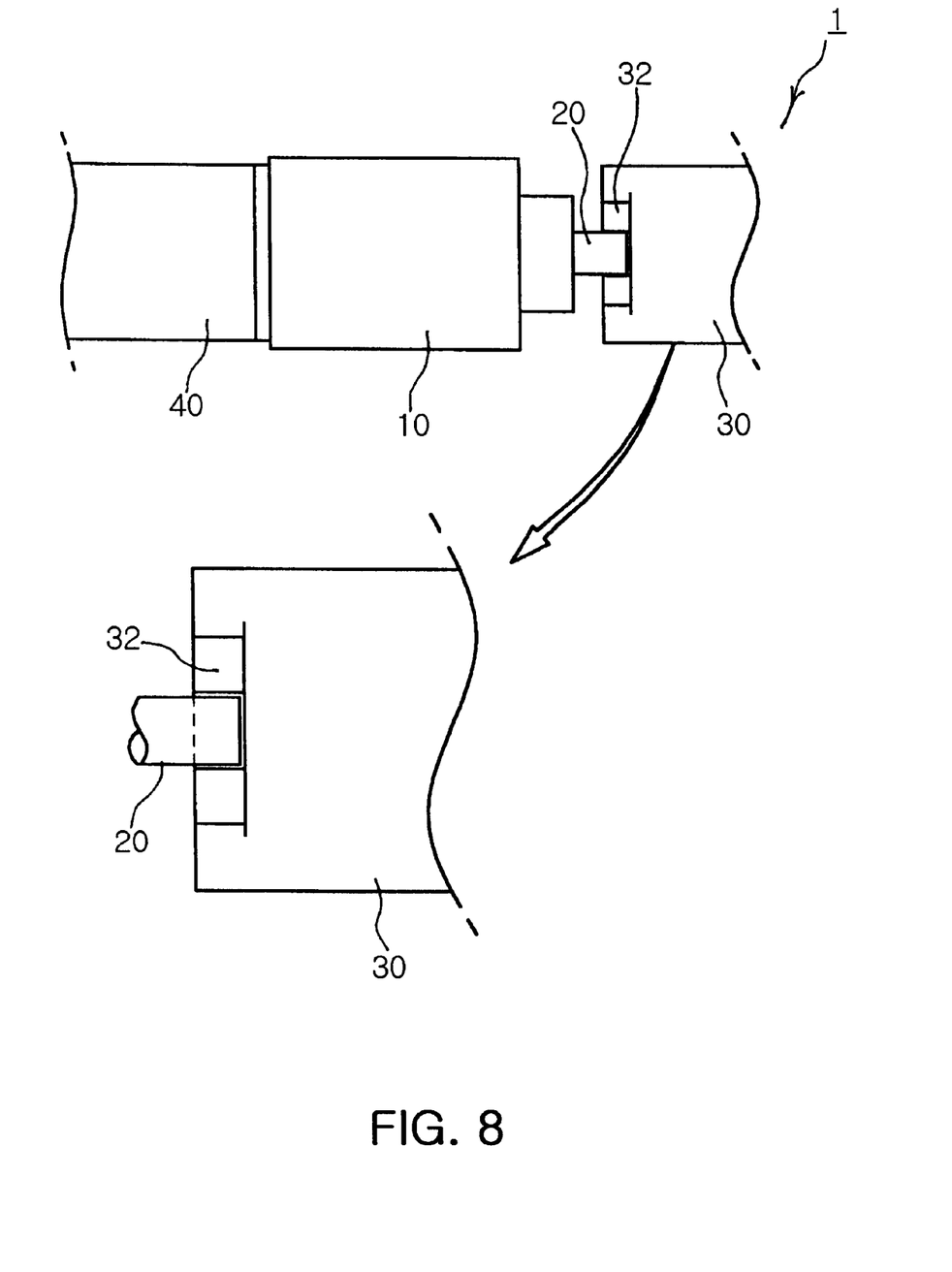
FIG. 8 is a plan view of the solid electrolytic capacitor according to the first embodiment of the present invention.
Figure 9:
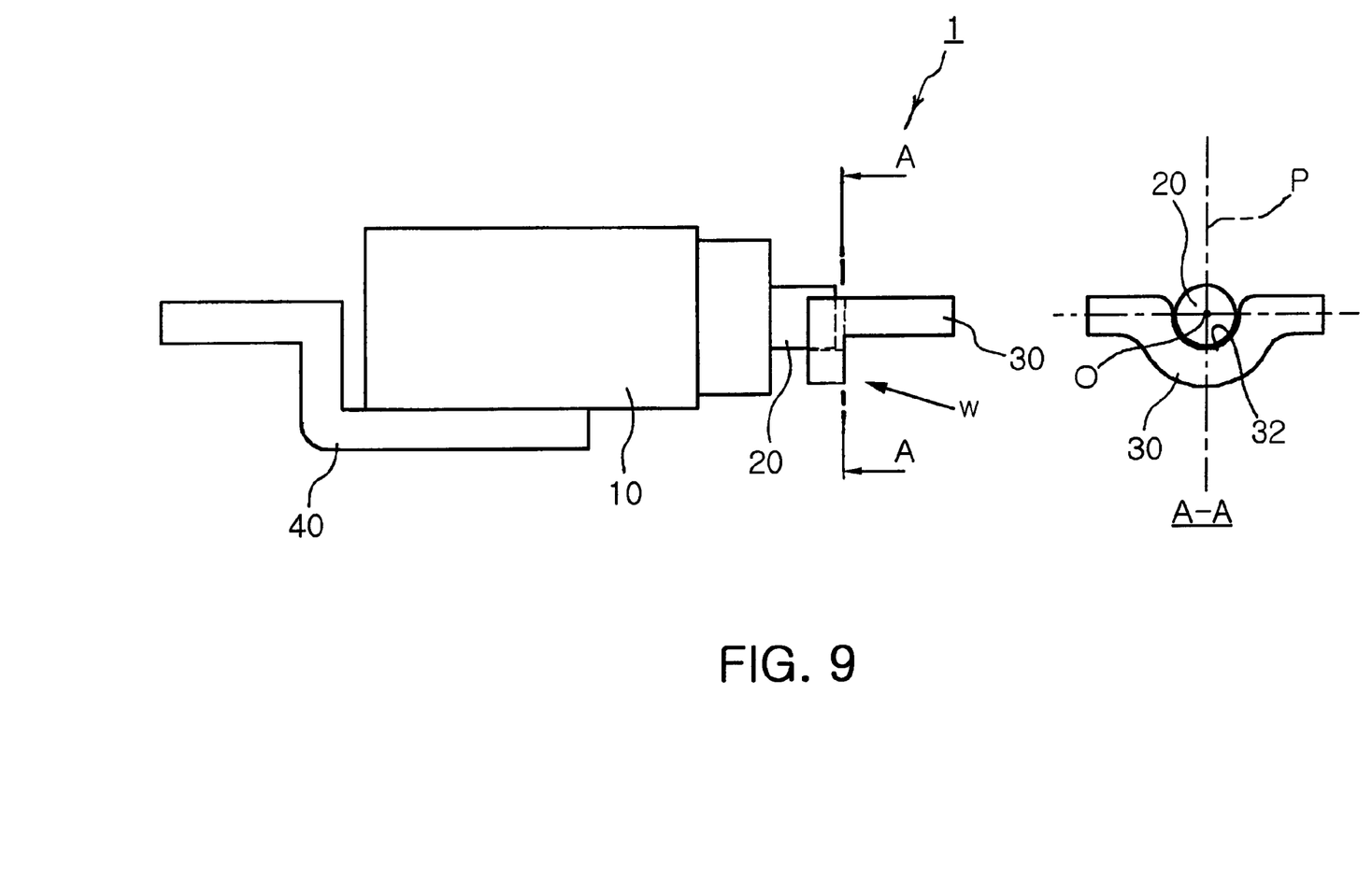
FIG. 9 is a view illustrating a solid electrolytic capacitor according to the first embodiment of the present invention.

FIG. 6 is a perspective view of a solid electrolytic capacitor according to the first embodiment of the present invention, FIG. 7 is a sectional view of the solid electrolytic capacitor according to the first embodiment of the present invention, FIG. 8 is a plan view of the solid electrolytic capacitor according to the first embodiment of the present invention, and FIG. 9 is a view illustrating a solid electrolytic capacitor manufactured according to the first embodiment of the present invention.

With reference to FIGS. 6 to 9, the solid electrolytic capacitor 1 of the present invention has an improved structure in which a capacitor element 10 is electrically welded to an anode lead frame 30 and a cathode lead frame 40, which results in stable electrical characteristics of the capacitor element 10, and an increased capacitance of the capacitor element 10 is obtained by enlarging the relative volume of the capacitor element 10 within a limited space of the capacitor.

The capacitor element 10 is a dielectric element produced by compressing tantalum powder in a shape of a rectangular parallelepiped, and the anode lead frame 30 and the cathode lead frame 40 are terminal members each consisting of a metal material with an excellent electrical conductivity. An anode wire 20 extends from a first side of the capacitor element 10 by a predetermined length.

Various materials such as niobium (Nb) oxide are selectively used as the capacitor element adopted in the solid electrolytic capacitor, and the material of the capacitor element is not restricted to tantalum (Ta) oxide.

A groove 32 is formed on a first end of the anode frame 30 for partially mounting the end portion of the anode wire 20, and a second end of the anode frame 30 is formed as an anode terminal for mounting the capacitor on a PCB. At this time, the groove 32 is formed by pressing so as to be downwardly depressed during the production process of the anode lead frame.

The cathode lead frame 40 opposite to the anode lead frame 30 is attached to an external surface of the capacitor element 10 by a conductive adhesive at a first end thereof, and is mounted on the PCB at a second end thereof to be formed as a cathode terminal. The capacitor element 10, the anode lead frame 30 and the cathode lead frame 40 are housed in an epoxy case 50, thereby being protected from the environment.

The anode wire 20 is mounted on the groove 32 in such a way that it is in close a contact with the vertical side of the anode lead frame 32 positioned around the groove 32, and a laser beam from a laser welding machine is irradiated as a high temperature heat source to a portion of the anode lead frame 30 positioned around the end portion of the anode wire 20.

Because the anode lead frame 30 consists of a metal material such as iron having a lower melting point than tantalum constituting the anode wire 20, a portion of the vertical side of the anode lead frame 30 is melted by the heat source irradiated to the portion of the anode lead frame 30 positioned around the end portion of the anode wire 20. However, the anode wire 20 in such a case is not melted, and the anode wire 20 is welded to the anode lead frame 30.

In other words, the end portion of the anode wire 20 is directly welded to the anode lead frame 30 by a frame melt without the aid of the metal such as lead, thereby preventing problems such as damage or an electrical open circuit owing to the melting of the metal caused by a high temperature during the mounting of the capacitor of the present invention.

Additionally, a heat transfer path, along which heat generated in laser welding step is transferred to the capacitor element 10 through the terminal side of the anode wire 20, can be considerably lengthened. In addition, the external surface of the anode wire 20 is mostly covered with the groove 32, and so the heat generated around the welded area is absorbed by the frame surrounding the wire, thus minimizing the heat transferred to the capacitor element 10. Therefore, the heat impact to the capacitor element 10 is minimized. Furthermore, the capacitor element 10 of the present invention becomes larger than that of a conventional structure in which the terminal end of the anode wire 20 is electrically welded to the anode lead frame 30 by reducing the length of the anode wire 20 in the epoxy case 50, which results in an increased capacitance of the capacitor element 10.

The laser welding machine may be positioned on a vertical line 'P' at right angles to the center 'O' of the anode wire 20, and provides a heat source melting the vertical side of the anode lead frame 30 opposite to the terminal end of the anode wire 20. At this time, the center 'O' of the anode wire 20 mounted on the groove 32 coincides with the center of a laser beam, that is, the heat source irradiated from the laser welding machine, and thus the concentration degree of the laser beam melting the anode lead frame 30 is increased, thereby the welding process is accurately accomplished.

Alternatively, the laser welding machine may be positioned under the anode wire 20 and provides the heat source in a direction 'W' indicated by the arrow to an external lower side of the groove 32 on which the end portion of the anode wire 20 is mounted, as shown in FIG. 9. At this time, a spark generated upon welding of the anode lead frame 20 using the laser beam is prevented from reaching the capacitor element 10 by the blocking of the anode lead frame 30, thereby preventing damage to the capacitor element 10.

Meanwhile, the anode lead frame 30 is depressed by a predetermined external force to form the groove 32 on which the end portion of the anode wire 20 is partially mounted, in order to prevent movement of the anode wire 20 during the welding and accomplish an accurate welding process. It is preferable that the groove 32 is positioned at the center of a width of the first end of the anode lead frame 30 which is located on the same vertical line as the center of the heat source such as the laser beam of the laser welding machine.

Figure 10:
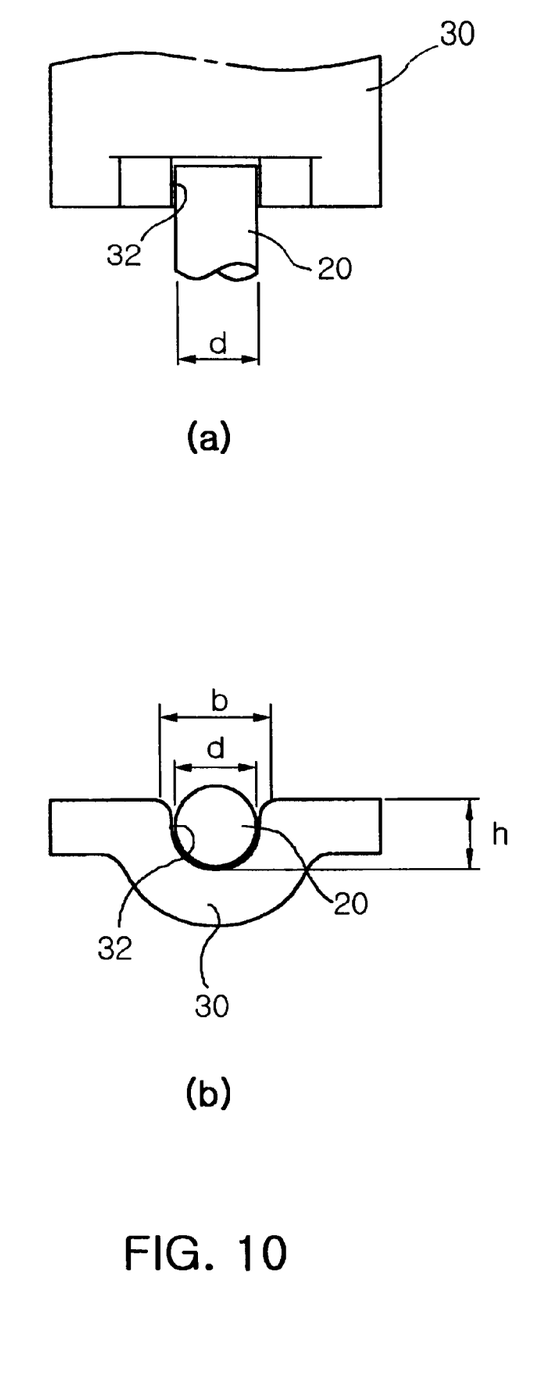
FIGS. 10a and 10b are a plan view and an elevational view of an arc-shaped groove adopted in the solid electrolytic capacitor according to the first embodiment of the present invention, respectively.
Figure 11:
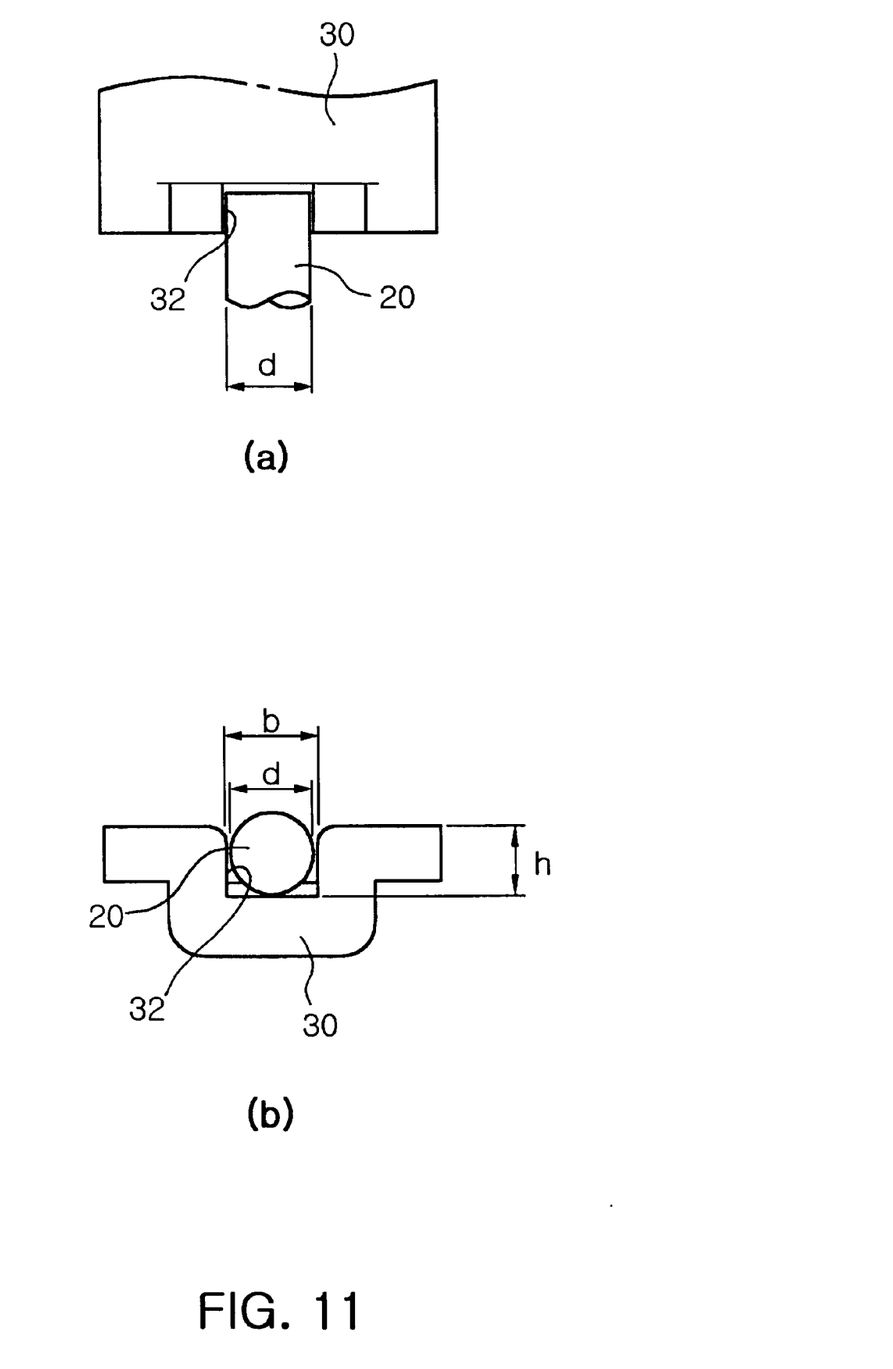
FIGS. 11a and 11b are a plan view and an elevational view of a rectangular groove adopted in the solid electrolytic capacitor according to a modification of the first embodiment of the present invention, respectively.
Figure 12:
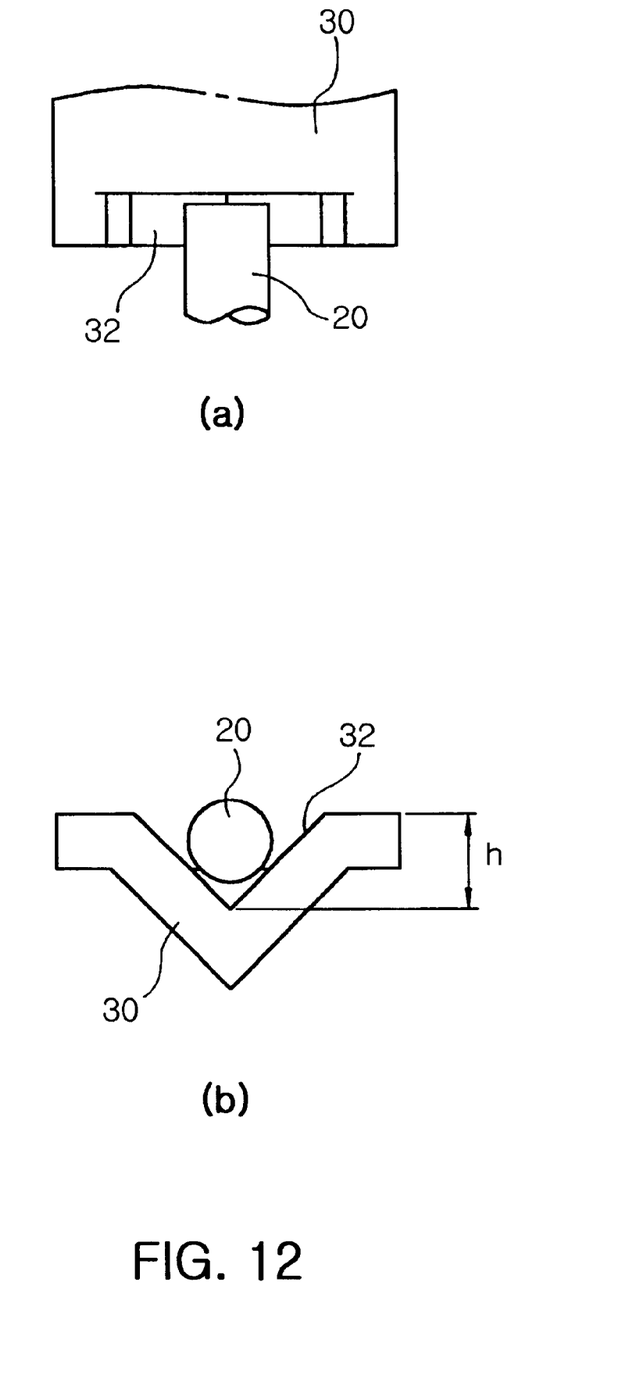
FIGS. 12a and 12b are a plan view and an elevational view of a triangular groove adopted in the solid electrolytic capacitor according to another modification of the first embodiment of the present invention, respectively.

The groove 32 may be formed with a circular arc shaped cross-section so as to be in contact with a circumferential surface of the rod-shaped anode wire 20, as shown in FIGS. 10(a) and 10(b). Alternatively, the groove 32 may be formed with a polygonal cross-section such as a triangle and a quadrangle so as to be in contact with the circumferential surface of the rod-shaped anode wire 20 at two or more contact points, as shown in FIGS. 11(a) to 12(b).

The anode wire 20 mounted on the groove 32 is preferably formed with the same cross-sectional shape as the groove 32 so as to improve the heat removing ability of the anode lead frame 30 by increasing the contact area between the external surface of the anode wire and the internal surface of the groove 32.

The depth 'h' of the groove 32 is less than the outer diameter 'd' of the anode wire 20, so that the upper portion of the anode wire 20 is partially protruded outside of the groove 32, and also the outer diameter 'd' of the anode wire 20 is preferably smaller than the width 'b' of the groove 32. At this time, a frame melt does not flow to the outside of the groove 32, but smoothly flows between the anode wire 20 and the anode lead frame 30 to improve the weldability between the anode wire 20 and the anode lead frame 30.

Figure 13:
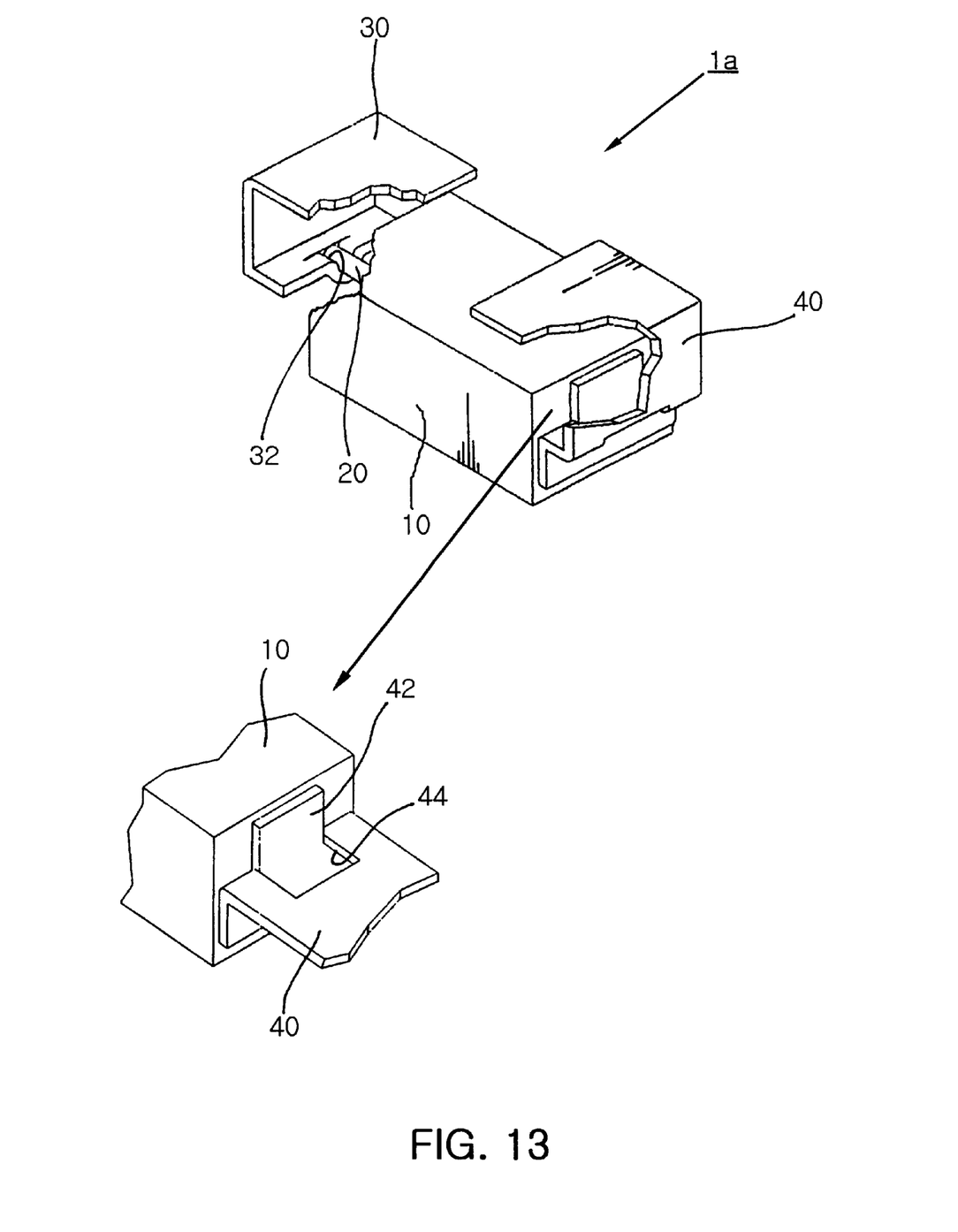
FIG. 13 is a perspective view of a solid electrolytic capacitor according to a second embodiment of the present invention.
Figure 14:
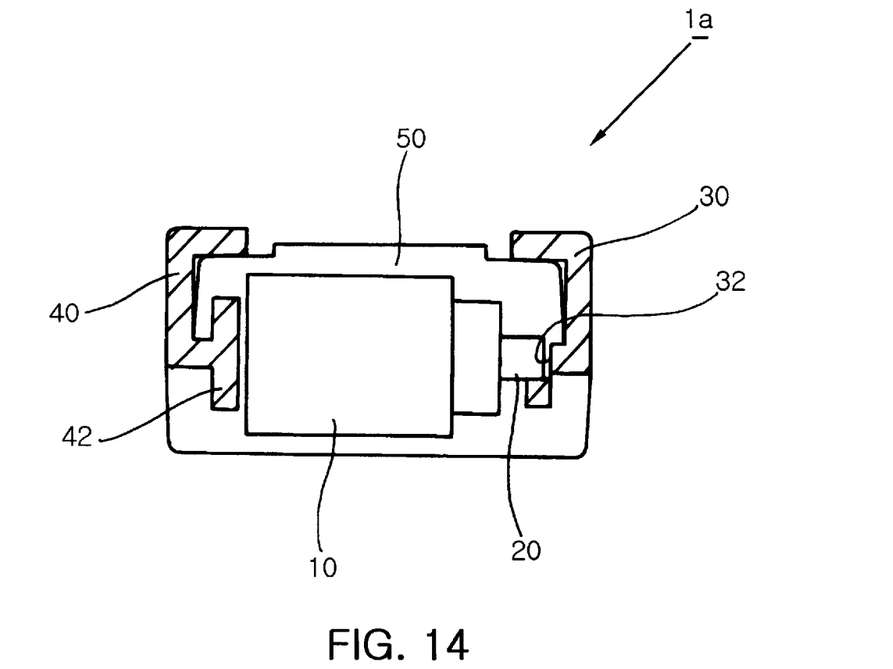
FIG. 14 is a sectional view of the solid electrolytic capacitor according to the second embodiment of the present invention.
Figure 15:
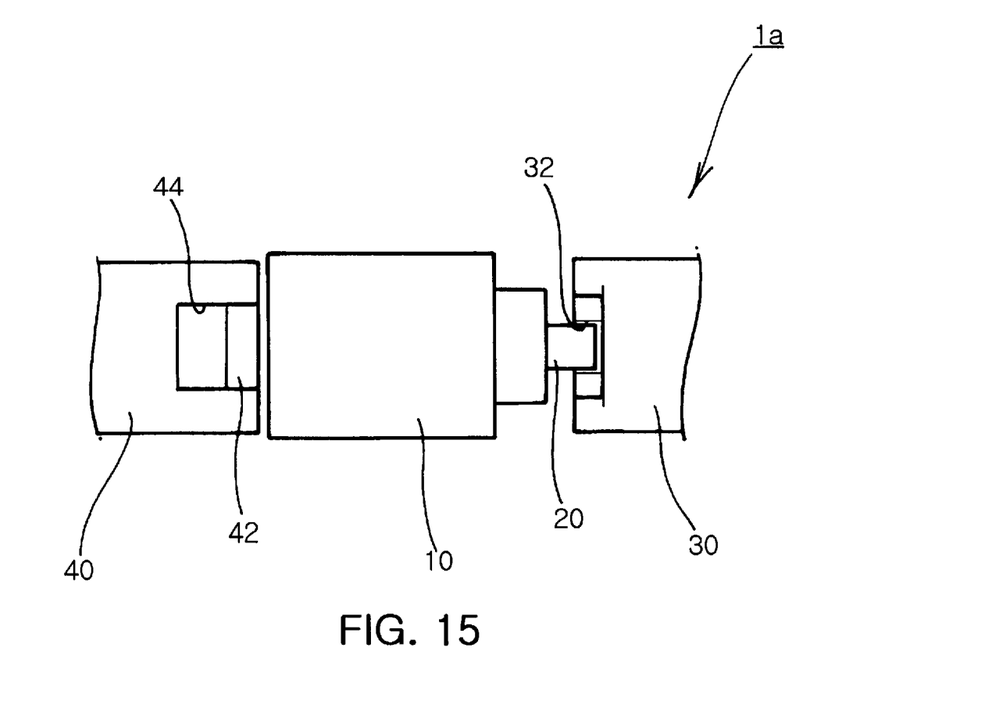
FIG. 15 is a plan view of the solid electrolytic capacitor according to the second embodiment of the present invention.
Figure 16:
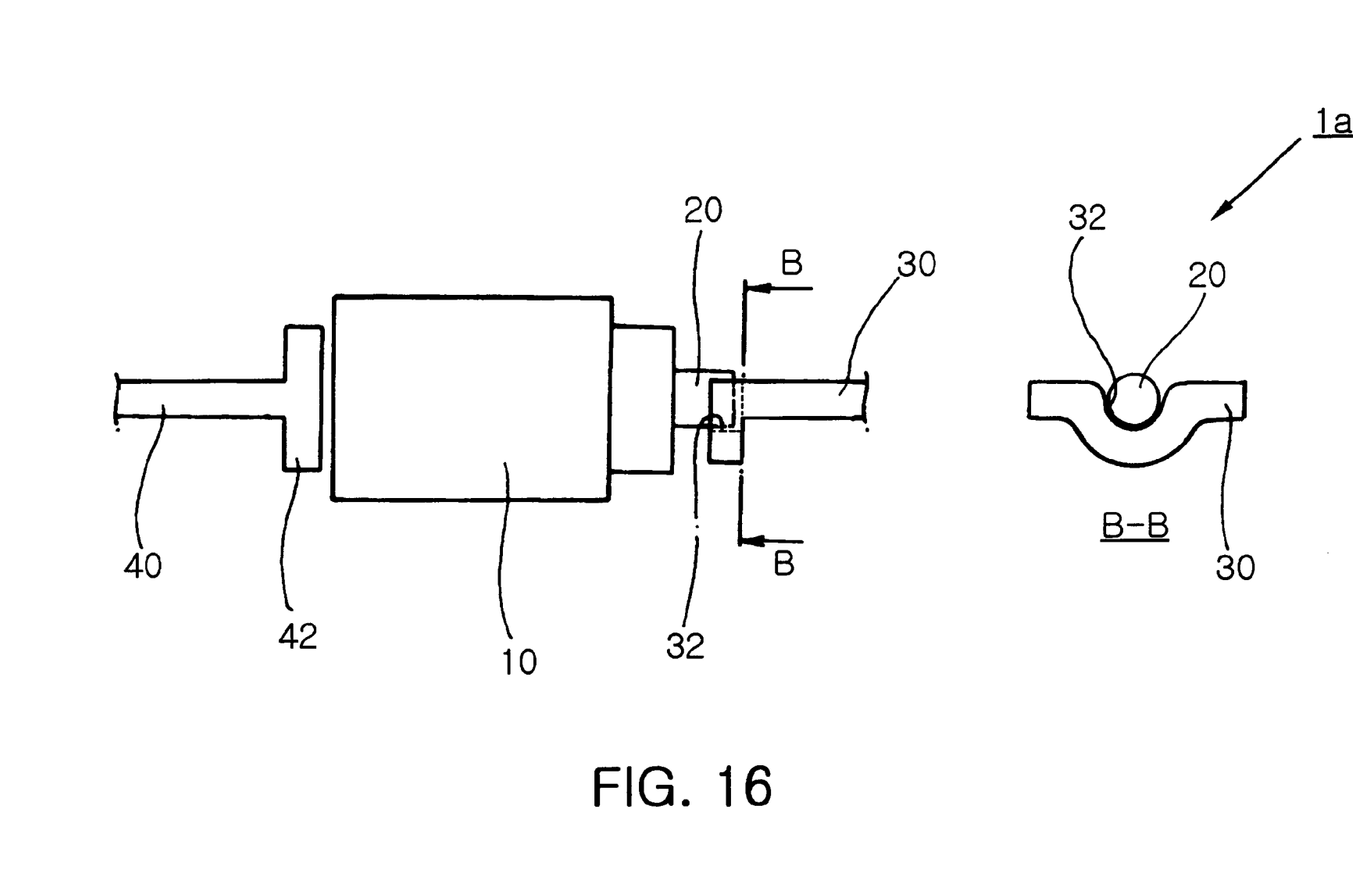
FIG. 16 is a side view of the solid electrolytic capacitor according to the second embodiment of the present invention.

FIG. 13 is a perspective view of a solid electrolytic capacitor according to a second embodiment of the present invention, FIG. 14 is a sectional view of the solid electrolytic capacitor according to the second embodiment of the present invention, FIG. 15 is a plan view of the solid electrolytic capacitor according to the second embodiment of the present invention, and FIG. 16 is a side view of the solid electrolytic capacitor according to the second embodiment of the present invention.

According to the second embodiment of the present invention, the solid electrolytic capacitor 1a is characterized in that a cathode lead frame 40 led as a cathode terminal has a flat contact plate 42 positioned on the first end thereof, in contact with the vertical side of the capacitor element 10 by a conductive adhesive, as shown in FIGS. 13 to 16.

The contact plate 42 with a 'T'-shaped cross-section is formed by bending an inside portion, which is formed by cutting along a 'U'-shaped cutting line 44 drawn on a surface of the first end of the cathode lead frame 40, in an upward and vertical direction, and by bending a remaining part of the first end of the cathode lead frame 40 around ends of the cutting line 44 in a downward and vertical direction.

In this case, the contact plate 42 is in contact with the most area of the vertical side of the capacitor element 10 to form a broad contact area, thereby preventing a short circuit. Furthermore, by moving the contact location of the cathode lead frame to the vertical side, the height of the capacitor element 10 of the present invention becomes greater than that of a conventional structure in which the first end of the cathode lead frame 140 is soldered to a flat lower part of the capacitor element 110. This increased volume of the capacitor element 10 results in an increased capacitance of the capacitor element 10.

It is preferable that the welding step of the anode wire 20 to the anode lead frame 30 is accomplished after the soldering step of the capacitor element 10 to the cathode lead frame 40. At this time, a frame melt having flowed between the anode wire 20 and the anode lead frame 30 prevents the capacitor element 10 from longitudinally deforming, thereby an assembly of the capacitor element and the lead frame is accurately accomplished.

Therefore, the present invention is advantageous in that an anode wire is mounted on a groove of an anode lead frame without movement of the anode wire, and welded to the anode lead frame by a heat source such as a laser beam, thereby a bending process necessarily accompanied in a conventional electric spot welding process can be omitted and so the production cost of the solid electrolytic capacitor of this invention can be reduced.

Other advantages of the present invention are that the heat transfer to a capacitor element is minimized by removing heat generated by a welding process, and the electric characteristics of the capacitor element are stabilized by preventing mechanical impact and thus the operational reliability of this solid electrolytic capacitor can be improved. Furthermore, the capacitor element becomes relatively large in size by increasing the space occupied by the capacitor element in an epoxy case for protecting the capacitor element, which results in an increased capacitance of the capacitor element.

The present invention has been described in an illustrative manner, and it is to be understood that the terminology used is intended to be in the nature of description rather than of limitation. Many modifications and variations of the present invention are possible in light of the above teachings. Therefore, it is to be understood that within the scope of the appended claims, the invention may be practiced otherwise than as specifically described.

What is claimed is:

1. A solid electrolyte capacitor comprising:
   a capacitor element;
   an anode wire extending from a first side of said capacitor element by a predetermined length;
   an anode lead frame having a groove at a first end thereof for receiving an end portion of said anode wire, and having a second end thereof for mounting on a PCB (Printed Circuit Board) as an anode terminal, said groove in said anode lead frame being formed by a deformation of said anode lead frame and said groove extending laterally in a direction of an axis of said anode wire; and
   a cathode lead frame having a first end attached to an external surface of said capacitor element and a second end for mounting on said PCB;
   wherein said anode wire is welded to said anode lead frame.

2. The solid electrolytic capacitor according to claim 1, wherein said anode lead frame comprises a metal material with a lower melting point than that of said anode wire.

3. The solid electrolytic capacitor according to claim 1, wherein said cathode lead frame has a contact plate at said first end thereof, said contact plate being affixed to a vertical second side of said capacitor element by a conductive adhesive.

4. The solid electrolytic capacitor according to claim 3, wherein said contact plate has a 'T'-shaped cross-section formed by bending an inside portion, which is formed by cutting along a 'U'-shaped cutting line drawn on a surface of said first end of said cathode lead frame, in an upward and vertical direction, and by bending a remaining portion of said first end of said cathode lead frame around ends of said cutting line in a downward and vertical direction.

5. The solid electrolytic capacitor according to claim 1, wherein said groove has a circular arc-shaped cross-section so as to be in contact with a circumferential surface of said anode wire.

6. The solid electrolytic capacitor according to claim 1, wherein said groove has a polygonal cross-section so as to be in contact with a circumferential surface of said anode wire at two or more points.

7. The solid electrolytic capacitor according to claim 1, wherein a depth of said groove is less than an outer diameter of said anode wire received therein so that an upper portion of said anode wire partially protrudes outside of said groove.

8. The solid electrolytic capacitor according to claim 1, wherein said anode wire received within said groove has a cross-sectional shape that is the same as that of said groove.

9. The solid electrolytic capacitor according to claim 1, further comprising a mold case covering said capacitor element, said anode lead frame, and said cathode lead frame.

10. The solid electrolytic capacitor according to claim 1, wherein said anode wire is welded to said anode lead frame by melting a portion of said anode lead frame in contact with said end portion of said anode wire position on said groove, using a heat source.

11. The solid electrolytic capacitor according to claim 10, wherein said heat source is a laser beam melting said anode lead frame, irradiated from a laser welding machine positioned above said groove.

12. The solid electrolytic capacitor according to claim 10, wherein said heat source is a laser beam melting said anode lead frame, irradiated from a laser welding machine positioned under said anode lead frame.

13. A solid electrolytic capacitor, comprising:
    a capacitor element;
    an anode wire extending from a first side of said capacitor element by a predetermined length;
    an anode lead frame having a first end thereof connected to an end portion of said anode wire, and a second end thereof for mounting on a PCB (Printed Circuit Board) as an anode terminal;
    a cathode lead frame having a contact plate at said first end thereof and a second end for mounting on a PCB, wherein said contact plate is in contact with a vertical second side of said capacitor element, and has a 'T'-shaped cross-section formed by bending an inside portion, which is formed by cutting along a 'U'-shaped cutting line drawn on a surface of said first end of the cathode lead frame, in an upward and vertical direction, and by bending a remaining part of said first end of said cathode lead frame around ends of said cutting line in a downward and vertical direction; and
    a mold case covering said capacitor element, said anode lead frame, and said cathode lead frame.

14. A solid electrolytic capacitor comprising:
    a capacitor element;
    an anode wire extending from a first side of said capacitor element by a predetermined length;
    an anode lead frame having a groove at a first end thereof for receiving an end portion of said anode wire, and having a second end thereof for mounting on a PCB (Printed Circuit Board) as an anode terminal; and
    a cathode lead frame having a first end attached to an external surface of said capacitor element and a second end for mounting on said PCB;
    wherein said anode wire is welded to said anode lead frame;
    wherein said anode wire is welded to said anode lead frame by melting a portion of said anode lead frame in contact with said end portion of said anode wire position on said groove; and
    wherein said heat source comprises a laser beam melting said anode lead frame, a radiated from a laser welding machine position by their above said groove or under said anode lead frame.

15. A solid electrolytic capacitor comprising:

a capacitor element;

an anode wire extending from a first side of said capacitor element by a predetermined length;

an anode lead frame having a groove at a first end thereof for receiving an end portion of said anode wire, and having a second end thereof for mounting on a PCB (Printed Circuit Board) as an anode terminal; and a cathode lead frame having a first end attached to an external surface of said capacitor element and a second end for mounting on said PCB;

wherein said anode wire is welded to said anode lead frame; and wherein said anode lead frame comprises a metal material with a lower melting point than that of said anode wire.

16. A solid electrolytic capacitor comprising:

a capacitor element;

an anode wire extending from a first side of said capacitor element by a predetermined length;

an anode lead frame having a groove at a first end thereof for receiving an end portion of said anode wire, and having a second end thereof for mounting on a PCB (Printed Circuit Board) as an anode terminal; and a cathode lead frame having a first end attached to an external surface of said capacitor element and a second end for mounting on said PCB;

wherein said anode wire is welded to said anode lead frame; and wherein said cathode lead frame has a contact plate at said first end thereof, said contact plate being affixed to a vertical second side of said capacitor element by a conductive adhesive.

17. The solid electrolytic capacitor according to claim 16, wherein said contact plate has a 'T'-shaped cross-section formed by bending an inside portion, which is formed by cutting along a 'U'-shaped cutting line drawn on a surface of said first end of said cathode lead frame, in an upward and vertical direction, and by bending a remaining portion of said first end of said cathode lead frame around ends of said cutting line in a downward and vertical direction.

18. A solid electrolytic capacitor comprising:

a capacitor element;

an anode wire extending from a first side of said capacitor element by a predetermined length;

an anode lead frame having a groove at a first end thereof for receiving an end portion of said anode wire, and having a second end thereof for mounting on a PCB (Printed Circuit Board) as an anode terminal; and a cathode lead frame having a first end attached to an external surface of said capacitor element and a second end for mounting on said PCB;

wherein said anode wire is welded to said anode lead frame; and wherein said groove has either a circular arc-shaped cross-section so as to be in contact with a circumferential surface of said anode wire or a polygonal cross-section so as to be in contact with a circumferential surface of said anode wire at two or more points.

19. A solid electrolytic capacitor comprising:

a capacitor element;

an anode wire extending from a first side of said capacitor element by a predetermined length;

an anode lead frame having a groove at a first end thereof for receiving an end portion of said anode wire, and having a second end thereof for mounting on a PCB (Printed Circuit Board) as an anode terminal; and a cathode lead frame having a first end attached to an external surface of said capacitor element and a second end for mounting on said PCB;

wherein said anode wire is welded to said anode lead frame; and wherein a depth of said groove is less than an outer diameter of said anode wire received therein so that an upper portion of said anode wire partially protrudes outside of said groove.

20. A solid electrolytic capacitor comprising:

a capacitor element;

an anode wire extending from a first side of said capacitor element by a predetermined length;

an anode lead frame having a groove at a first end thereof for receiving an end portion of said anode wire, and having a second end thereof for mounting on a PCB (Printed Circuit Board) as an anode terminal; and a cathode lead frame having a first end attached to an external surface of said capacitor element and a second end for mounting on said PCB;

wherein said anode wire is welded to said anode lead frame; and wherein said anode wire received within said groove has a cross-sectional shape that is the same as that of said groove.

* * * * *